No. 862,734. PATENTED AUG. 6, 1907.
A. F. HENDRICKS.
CORN AND MAIZE HEADER AND CUTTER.
APPLICATION FILED OCT. 30, 1905.
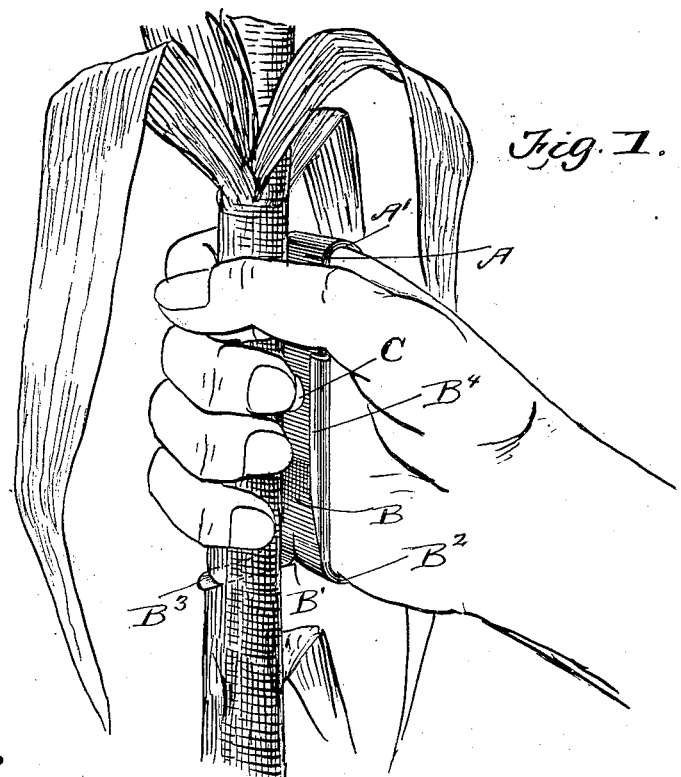
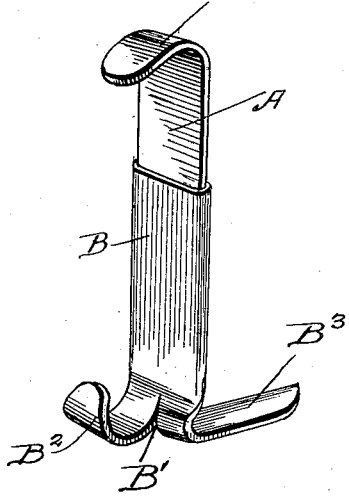
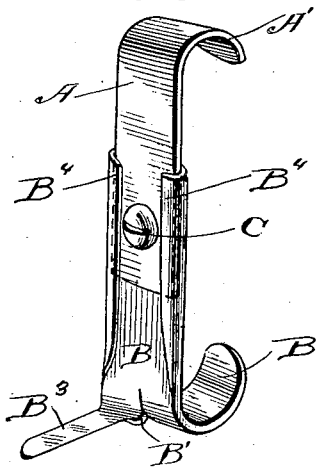
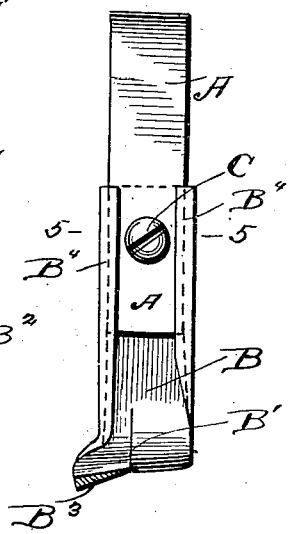
WITNESSES:
INVENTOR
A. F. Hendricks
BY
ATTORNEYS

UNITED STATES PATENT OFFICE.

ALEXANDER F. HENDRICKS, OF WARREN, OKLAHOMA TERRITORY.

CORN AND MAIZE HEADER AND CUTTER.

No. 862,734.  Specification of Letters Patent.  Patented Aug. 6, 1907.

Application filed October 30, 1905. Serial No. 285,013.

*To all whom it may concern:*

Be it known that I, ALEXANDER F. HENDRICKS, a citizen of the United States, residing at Warren, in the county of Greer, in the Territory of Oklahoma, have invented a useful Improvement in Corn and Maize Headers and Cutters, of which the following is a specification.

This invention is a novel construction of corn cutter or header, particularly adapted for cutting or heading Kafir corn or maize. At the present time Kafir corn is usually cut or headed by means of a knife, but this operation is slow for the reason that it is necessary to grasp the stalk in one hand and use the knife with the other.

The object of my invention is to provide a device which can be used in pairs, one upon each hand, the said device being so constructed and arranged that the stalk can be grasped in the hand and the cutting operation carried on simultaneously.

Another object of my invention is to provide a device which may be made to fit any size of hand and which can be used either with or without a glove.

With these objects in view my invention consists essentially in the employment of two hooked shaped members adjustably connected to each other and adapted to fit upon the hand, the lower member carrying an inwardly projecting blade which serves as a cutter.

The invention consists also in certain details hereinafter fully described and pointed out in the claims.

In the drawings forming a part of this specification:—Figure 1 is a view showing the practical application of my invention. Fig. 2 is a detail perspective view of the device taken from one side, and Fig. 3 is a perspective view taken from the opposite side. Fig. 4 is a face view, the cutting blade being shown in section, and Fig. 5 is a detail sectional view taken on the line 5—5 of Fig. 4.

In carrying out my invention, I employ an upper metallic member A, which is curved or hooked at A' to fit over the hand as most clearly shown in Fig. 1. In connection with the member A is the lower member B, the lower end of which is bifurcated or split as shown at B', one portion thereof being curved or hooked at B² and adapted to fit under the opposite side of the hand as shown in Fig. 1, and the other portion of the bifurcated end is bent in the reverse direction and sharpened to provide a cutting blade B³. The edges of the lower member B are rolled over as shown at B⁴ providing guides in which the upper member slides, and a set screw C passes through said upper member and bears against the lower member for the purpose of locking the members together at any desired point of adjustment.

By having the members adjustable upon each other as herein shown and described, it is obvious that the device can be made to fit various sizes of hands, and furthermore that the device can be adjusted, if desired, so that it can be used either with or without a glove.

The devices are made in pairs and are arranged upon the hands of the operator, and in operation the stalk to be cut is grasped at the proper point and by sliding downward and inward, the cutting blade can be passed through the stalk while said stalk is held in the hand and by means of a tool of this kind the stalk can be cut at exactly the proper point, and furthermore by having one upon each hand the cutting or heading operations can be carried on just twice as fast as ordinary, as the operator will be able to use both hands for cutting.

It will thus be seen that I provide an exceedingly cheap, simple and efficient structure of corn cutter or header.

Having thus described the invention, what I claim is:—

1. A device of the kind described, comprising two members shaped to fit upon the hand, slidably connected together, one of said members being provided with a guideway to receive the other member, and a cutting blade carried by the member with the guideway.

2. A device of the kind described, comprising two hooked shaped members slidably connected together, one of said members being provided with a guideway to receive the other member, a set-screw carried by said member adapted to engage the member with the guideway, and a cutting blade extending out from the lower end of the member with the guideway.

3. A device of the kind described comprising an upper member curved at its upper end, and a lower member bifurcated at its lower end, one portion thereof being curved upwardly and the other portion bent inwardly and sharpened, providing a cutting edge said member being provided with guides to receive the upper member, as set forth.

4. A device of the kind described comprising the upper member curved at its upper end, the lower member curved at its lower end and carrying the inwardly projecting cutting blade and provided with guides to receive the upper member, and means for fastening the members together, as set forth.

5. A device of the kind described comprising the upper member curved at its upper end, the lower member curved at its lower end and carrying the inwardly projecting cutting blade also at said lower end, the guides carried by the lower member and the set screw passing through the upper member and bearing upon the lower member, as set forth.

6. A device of the kind described comprising a band curved at its opposite end and adapted to fit the hand, and an inwardly projecting cutting blade carried at the lower end of the band, guides formed on said blade, a band mounted in said guides having a curved upper end and a set-screw mounted in the band with the guide adapted to engage the band arranged in the guides.

ALEXANDER F. HENDRICKS.

Witnesses:
W. E. TRAYLOR,
D. V. PERRY.